US00RE39139E

(19) United States
(12) Reissued Patent
Blasey et al.

(10) Patent Number: US RE39,139 E
(45) Date of Reissued Patent: Jun. 20, 2006

(54) PROCESS FOR PREPARING HOUSEHOLD DETERGENT OR CLEANER SHAPES

(75) Inventors: Gerhard Blasey, Duesseldorf (DE); Dieter Jung, Hilden (DE); Hans-Friedrich Kruse, Korschenbroich (DE); Fred Schambill, Monheim (DE)

(73) Assignee: Henkel KGaA, Duesseldorf-Holthausen (DE)

(21) Appl. No.: 10/414,962

(22) Filed: Apr. 16, 2003

Related U.S. Patent Documents

Reissue of:
(64) Patent No.: 6,506,720
Issued: Jan. 14, 2003
Appl. No.: 09/396,549
Filed: Sep. 3, 1999

U.S. Applications:

(63) Continuation of application No. PCT/EP98/01203, filed on Mar. 4, 1998.

(30) Foreign Application Priority Data

Mar. 13, 1997 (DE) ..... 197 10 254

(51) Int. Cl.
*C11D 11/00* (2006.01)

(52) U.S. Cl. ..... 510/446; 510/224; 510/294; 510/298; 510/473

(58) Field of Classification Search ..... 510/446, 510/224, 294, 298, 473
See application file for complete search history.

(56) References Cited

U.S. PATENT DOCUMENTS

| | | | | | |
|---|---|---|---|---|---|
| 2,560,097 | A | * | 7/1951 | Emerson, Jr. et al. | 510/138 |
| 3,338,836 | A | * | 8/1967 | Krusius et al. | 510/381 |
| 3,360,469 | A | * | 12/1967 | Fuchs | 510/381 |
| 3,370,015 | A | * | 2/1968 | Van Kampen et al. | 510/446 |
| 3,417,024 | A | * | 12/1968 | Goldwasser | 510/446 |
| 3,424,842 | A | * | 1/1969 | Nurnberg | 424/94.21 |
| 3,490,742 | A | | 1/1970 | Nichols et al. | 424/464 |
| 3,622,677 | A | * | 11/1971 | Short et al. | 514/778 |
| 3,951,821 | A | * | 4/1976 | Davidson | 252/1 |
| 3,953,350 | A | * | 4/1976 | Fujino et al. | 510/298 |
| 4,013,581 | A | * | 3/1977 | Huber | 252/186.26 |
| 4,072,535 | A | * | 2/1978 | Short et al. | 106/206.1 |
| 4,219,435 | A | * | 8/1980 | Biard et al. | 510/439 |
| 4,230,590 | A | | 10/1980 | Wixon | 510/308 |
| 4,269,859 | A | * | 5/1981 | Morse | 514/781 |
| 4,361,545 | A | * | 11/1982 | Powell et al. | 424/465 |
| 4,369,308 | A | * | 1/1983 | Trubiano | 536/106 |
| 4,551,177 | A | * | 11/1985 | Trubiano et al. | 106/206.1 |
| 4,585,642 | A | * | 4/1986 | Rieck | 423/333 |
| 4,622,161 | A | * | 11/1986 | Cornelissens et al. | 510/439 |
| 4,642,197 | A | * | 2/1987 | Kruse et al. | 510/298 |
| 4,695,397 | A | * | 9/1987 | Sommer et al. | 524/41 |
| 4,751,015 | A | * | 6/1988 | Humphreys et al. | 510/376 |
| 4,818,426 | A | * | 4/1989 | Humphreys et al. | 510/375 |
| 4,950,310 | A | * | 8/1990 | Rieck et al. | 23/295 R |
| 5,000,947 | A | | 3/1991 | Nichols | 424/69 |
| 5,006,345 | A | * | 4/1991 | Lang | 424/467 |
| 5,043,091 | A | * | 8/1991 | Joshi et al. | 510/294 |
| 5,360,567 | A | * | 11/1994 | Fry et al. | 510/298 |
| 5,382,377 | A | * | 1/1995 | Raehse et al. | 510/445 |
| 5,407,594 | A | * | 4/1995 | Fry et al. | 510/439 |
| 5,411,673 | A | * | 5/1995 | Agar et al. | 510/312 |
| 5,468,286 | A | * | 11/1995 | Wai-Chiu et al. | 106/205.01 |
| 5,656,584 | A | * | 8/1997 | Angell et al. | 501/441 |
| 5,681,475 | A | * | 10/1997 | Lamensdorf et al. | 210/666 |
| 5,783,545 | A | * | 7/1998 | Paatz et al. | 510/305 |
| 5,866,531 | A | * | 2/1999 | Assmann et al. | 510/446 |
| 5,900,399 | A | * | 5/1999 | Seiter et al. | 510/446 |
| 6,051,545 | A | * | 4/2000 | Boskamp | 510/446 |
| 6,221,832 | B1 | * | 4/2001 | Casteel et al. | 510/446 |
| 6,232,285 | B1 | * | 5/2001 | Casteel et al. | 510/446 |
| 6,288,016 | B1 | * | 9/2001 | Ramanan et al. | 510/357 |
| 6,294,509 | B1 | * | 9/2001 | Meiwa et al. | 510/130 |
| 6,303,560 | B1 | * | 10/2001 | Hartan et al. | 510/446 |
| 6,358,910 | B1 | | 3/2002 | Boskamp et al. | 510/446 |
| 6,372,707 | B1 | | 4/2002 | Boskamp et al. | 510/440 |

FOREIGN PATENT DOCUMENTS

| | | | |
|---|---|---|---|
| BE | 821550 | | 4/1975 |
| DE | 1228029 | * | 5/1964 |
| DE | 938566 | * | 2/1965 |
| DE | 2263939 | * | 12/1972 |
| DE | 2 263 940 | | 12/1972 |
| DE | 2321693 | * | 4/1973 |
| DE | 2321693 A | * | 11/1974 |
| DE | 2354096 A | * | 5/1975 |
| DE | 2362595 A | * | 6/1975 |
| DE | 23 62 595 | * | 6/1975 |

(Continued)

OTHER PUBLICATIONS

Novak, J., Enzyme Tablets, Chem. Abs. & Indexes vol. 22, No. 2 (Jan. 1995) XP000666852, Rompp Chemie Lexikon 9.sup.th Ed., vol. 6, pp. 3207–3212, 4295, 4439–4440 and 4990–4993.*

Rompp Chemie Lexikon 9th ed., vol. 6, p. 4440 (English Translation, No Date Available.*

Lehrbuch der pharmazeutischen Technologie, 6 (1987) pp. 182–184 (English Translation).*

SOFW–Journal, 122, (1996) pp. 1016–1021.*

(Continued)

*Primary Examiner*—Lorna M. Douyon
(74) *Attorney, Agent, or Firm*—Connolly Bove Lodge & Hutz LLP

(57) ABSTRACT

A process for making a detergent tablet by forming a disintegrating agent by compacting cellulose or a cellulose derivative, forming disintegrating agent particles comprising the disintegrating agent, dry mixing a washing- or cleaning-active substance and an amount of the disintegrating agent particles effective to rapidly dissolve or disperse the composition in water, and shaping the resulting mixture into a tablet. The disintegrating agent particles have a particle size distribution of less than 10% by weight smaller than about 0.2 mm particle size and no more than 1% by weight of dust-fine particles.

32 Claims, No Drawings

FOREIGN PATENT DOCUMENTS

| | | | | |
|---|---|---|---|---|
| DE | 3417649 | | * | 11/1985 |
| DE | 3417820 | | * | 11/1985 |
| DE | 3422055 | A | * | 12/1985 |
| DE | 3742043 | | * | 6/1989 |
| DE | 4121127 | | * | 1/1993 |
| DE | 4133862 | | * | 4/1993 |
| DE | 195 00 936 | | * | 7/1996 |
| DE | 197 09 991 | | * | 9/1998 |
| EP | 0075818 | | * | 4/1983 |
| EP | 0096680 | | * | 12/1983 |
| EP | 0352135 | | * | 7/1989 |
| EP | 0367339 | | * | 10/1989 |
| EP | 0266863 | | * | 3/1990 |
| EP | 0390251 | | * | 3/1990 |
| EP | 0425277 | | * | 10/1990 |
| EP | 0458397 | | * | 5/1991 |
| EP | 0466484 | | * | 7/1991 |
| EP | 0466485 | | * | 7/1991 |
| EP | 0458398 | | * | 11/1991 |
| EP | 0522766 | | * | 6/1992 |
| EP | 0523099 | | * | 1/1993 |
| EP | 0549272 | | * | 6/1993 |
| EP | 0711827 | | * | 5/1996 |
| EP | 0711828 | | * | 5/1996 |
| EP | 0716144 | | * | 6/1996 |
| EP | 0737738 | | * | 10/1996 |
| EP | 0340013 | | * | 2/1997 |
| GB | 911204 | | * | 11/1962 |
| GB | 1423536 | | * | 2/1976 |
| GB | 2 242 130 | | * | 9/1991 |
| JP | 60-15500 | | * | 1/1985 |
| JP | 62-30198 | | * | 2/1987 |
| JP | 62-197497 | A2 | * | 9/1987 |
| JP | 62-197497 | | * | 9/1987 |
| JP | 2-311600 | | * | 12/1990 |
| JP | 04164999 | A2 | * | 6/1992 |
| JP | 05-247495 | | * | 9/1993 |
| JP | 7-286199 | | * | 10/1995 |
| NL | 7316457 | | | 7/1974 |
| WO | WO 91/15567 | | * | 10/1991 |
| WO | WO 95/06109 | | * | 3/1995 |
| WO | WO 96/06156 | | * | 2/1996 |
| WO | WO 96/28530 | | * | 9/1996 |
| WO | WO 98/40462 | | * | 9/1998 |
| WO | WO 98/55582 | | * | 12/1998 |
| WO | WO 98/55583 | | * | 12/1998 |
| WO | WO 98/55590 | | * | 12/1998 |

OTHER PUBLICATIONS

Mitteilungen der Deutschen Pharmazeutischen Gesellschaft der DDR [Communications from the German pharmaceutical society and from the pharmaceutical society of East Germany], vol. 38, 1968, pp. 165–181.*

Rehocel.RTM. 4500 mal kleiner—der Hilfsstoff der viele Probleme lost (1968).*

Ullmanns Enzyloadie der Technischen Chemie [Ullmann's Encyclopedia of Technical Chemistry], vol. 9, (4th ed. 1975), p. 187.*

Degussa company publication No. 38 "Tableting with ELCEMA" (Jan. 1984).*

Degussa company publication No. 67 "ELCEMA auxiliaries for direct tableting" (Dec. 1989).*

"Untersuchungen über Kompaktierung und Trockengranulierung," *Pharmaceutica Acta Helvetiae*, vol. 41, pp. __ (Oct. 7, 1965).

Von E. Nurnberg, "Experimentelle Prüfungen von direct verpreβten Tablettengrundlagen", *Pharm. Ind.*, vol. 34, No. 3, pp. 193–206 (1972).

Von Engelbert Graf, "Cellulose, ein wertvoller Hilfs—und Rohstoff für die Arzneibereitung" *Deütsche Apotheker Zeitung*, vol. 118, No. 43, pp. 1625–1629 (Oct. 26, 1978).

Size Conversion Table (U.S. Mesh, Tyler Mesh, Inches, and Microns), no date.

Versuchsberitch über das Nacharbeiten von US–Patent Nr. 4,269,859 zur Bestimmung des Schüttgewichtes des verdichteten Cellulosegranulats.

* cited by examiner

PROCESS FOR PREPARING HOUSEHOLD DETERGENT OR CLEANER SHAPES

Matter enclosed in heavy brackets [ ] appears in the original patent but forms no part of this reissue specification; matter printed in italics indicates the additions made by reissue.

This application is a continuing application filed under 35 U.S.C. §111(a), claiming priority under 35 U.S.C. §365 (c) of International Application PCT/EP98/01203 filed Mar. 4, 1998, which claims priority under 35 U.S.C. §119 of German Application No. 197 10 254.9 filed Mar. 13, 1997.

BACKGROUND OF THE INVENTION

This invention relates to washing- or cleaning-active shapes, above all tablets, such as detergent tablets, dishwasher tablets, stain remover tablets or water softening tablets, for use in the home, more particularly for use in machines, to a process for the production of these shapes and to their use.

Washing- or cleaning-active shapes, more particularly tablets, have a number of advantages over powder-form compositions, including easy handling, simple dosing and low packaging volumes. However, problems arise out of the fact that comparatively high pressures have to be applied in the compression of the powder-form constituents in order to achieve adequate dimensional stability and fracture resistance. On account of the high compression involved, tablets of the type in question often show unsatisfactory disintegrating and dissolving properties in use so that the active substances are reduced too slowly in the washing or cleaning cycle and textiles in particular are in danger of being left with residues after the wash cycle.

The problem of the slow disintegration of tablets has been known for some time, more especially in the pharmaceutical industry. Here, the problem has been overcome or at least eased by the addition of certain disintegration aids known as tablet disintegrators. According to Römpp (9th Edition, Vol. 6, page 4440) and Voigt "Lehrbuch der pharmazeutischen Technologie" (6th Edition, 1987), tablet disintegrators are auxiliaries which provide for the rapid disintegration of tablets in water or gastric juices and for the release of the pharmaceuticals in an absorbable form. According to their action mechanism, they are classed as substances which increase the porosity or capillarity ("wick effect") of tablets and which have a high adsorption capacity for water, as gas-evolving substances for effervescent tablets or as hydrophilicizing agents which ensure that the constituent particles of tablets are wetted in water. The first class includes the substances known as traditional disintegrating agents, such as starch, cellulose and cellulose derivatives, alginates, dextrans, crosslinked polyvinyl pyrrolidones and many others while the second class includes systems of weak acids and carbonate-containing agents, more particularly citric acid and tartaric acid in combination with hydrogen carbonate or carbonate. Examples of the third class are polyethylene glycol sorbitan fatty acid esters.

Thus, it is proposed in German patent application 938 566 to convert acetyl salicylic acid before compression into granules and, after complete but careful drying, to coat the granules thus formed with highly disperse silica. The acetyl salicylic acid granules coated with the highly disperse silica powder may then be mixed with other tablet ingredients, which may be present in powder form or granular form, and the resulting mixture is tabletted. The separating layer of highly disperse silica not only acts as an insulating layer and as protection against unwanted reactions, it also contributes towards the rapid disintegration of the tablets, even after prolonged storage.

German patent application 12 28 029 describes a process for the production of tablets in which powder mixtures—without preliminary granulation—are first mixed with cellulose powder and optionally highly disperse silica and the resulting mixture is compressed, in one preferred embodiment after grinding.

According to German patent application 41 21 127, a particularly effective auxiliary in the production of pharmaceutical tablets contains cellulose particles with a coating material fixed to their surface. The auxiliary is used in the form of fine particles, mean particle sizes below 200 μm being described as particularly advantageous. These fine-particle auxiliaries, which—in the production of pharmaceuticals—lead to tablets with both a relatively high fracture resistance and a relatively high disintegration rate, are produced in particular by a grinding process carried out in a ball mill.

Accordingly, conventional tablet disintegration belonging to the first class mentioned above are normally either mixed in very fine-particle form with the other tablet ingredients, which may be present in the form of fine particles or granules, before compression or the other tablet ingredients are coated or powdered/dusted with the tablet disintegrator.

According to the teaching of European patent EP-B 0 523 099, disintegrators known from the production of pharmaceuticals may also be used in detergents or cleaning products. The disintegrators mentioned include swellable layer silicates, such as bentonites, natural materials and derivatives thereof based on starch and cellulose, alginates and the like, potato starch, methyl cellulose and/or hydroxypropyl cellulose. These disintegrators may be mixed with, or even incorporated in, the granules to be compressed.

According to International patent application WO-A-96/06156 also, it can be of advantage to incorporate disintegrators in detergent or dishwasher tablets. Once again, microcrystalline cellulose, sugars, such as sorbitol, and also layer silicates, more particularly fine-particle swellable layer silicates of the bentonite and smectite type, are mentioned as typical disintegrators. Substances which contribute towards gas formation, such as citric acid, bisulfate, bicarbonate, carbonate and percarbonate, are also mentioned as possible disintegration aids.

Although neither of the last two prior-art documents cited above specifies the exact particle size distribution which suitable disintegrators are supposed to have, figures relating to the microcrystallinity of the cellulose and the particle fineness of the layer silicates suggest to the expert, above all in connection with the literature known from the production of pharmaceutical tablets, that conventional disintegrators are supposed to be used in fine-particle form. This is consistent with the fact that, hitherto, relatively coarse products obtained, for example, by granulation of fine powders, which are expressly marketed as tablet disintegrators, have not been commercially available.

European patent applications EP-A0 466 485, EP-A-0 522 766, EP-A-0 711 827, EP-A-0 711 828 and EP-A-0 716 144 describe the production of cleaning-active tablets in which compacted particulate material with a particle size of 180 to 2000 μm is used. The resulting tablets may have both a homogeneous structure and a heterogeneous structure. According to EP-A-0 522 766, the surfactant- and builder-containing particles at least are coated with a solution or dispersion of a binder/disintegration aid, more particularly polyethylene glycol. Other binders/disintegration aids are the already repeatedly described and known disintegrating agents, for example starches and starch derivatives, commercially available cellulose derivatives, such as crosslinked and modified cellulose, microcrystalline cellulose fibers, crosslinked polyvinyl pyrrolidones, layer silicates, etc. Other suitable coating materials are weak acids, such as citric acid or tartaric acid which, in conjunction with carbonate-containing sources, lead to effervescent effects on contact with water and which, according to Römpp's definition, belong to the second class of disintegrating agents. In these cases, too, no specific details are provided as to the particle size distribution of the disintegrators. However, they are all applied to the surface of granules. This is done either—as mentioned—in liquid to disperse form or in solid form. It is known to the expert in this connection that fine-particle solids, i.e. powder-like solids, which normally also contain relatively high percentages of dust, can be used for coating particles with particulate solids, so-called "powdering".

According to EP-A-0 711 827, the use of particles consisting predominantly of citrate, which has a certain solubility in water, also leads as a secondary effect to accelerated disintegration of the tablets. It is assumed that the dissolution of the citrate locally increases the ion strength over a transitional period so that the gelling of surfactants is suppressed and, as a result, the disintegration of the tablet is not impeded. According to this patent application, therefore, citrate is not a disintegrating agent in the accepted sense, but acts as an anti-gelling agent.

The proposed solutions mentioned in the foregoing produce the required result in the production of pharmaceutical tablets. Although, in the field of detergents and cleaning products, they contribute towards an improvement in the disintegration properties of washing- or cleaning-active tablets, the improvement achieved is inadequate in many cases. This applies in particular when the percentage of tacky organic substances in the tablets, for example anionic and/or nonionic surfactants, increases. This is one of the reasons why, hitherto, detergent tablets which satisfy stringent consumer requirements have not been commercially available. However, in the field of dishwashing detergents and detergent additives also, tablets do not have a sufficiently high disintegration rate despite an often satisfactory fracture resistance. Increasing the rate at which dishwasher tablets also disintegrate and dissolve can have advantages, particularly for phases which contain active substances that are supposed to be effective at the beginning of the dishwashing process or at relatively low temperatures.

Accordingly, the problem addressed by the present invention was to provide washing- or cleaning-active shapes which would contain a disintegrating agent with a high adsorption capacity for water that would be capable of increasing the porosity or the capillarity of the tablets and which would not have any of the disadvantages mentioned above. Another problem addressed by the invention was to provide a process for the production of these improved washing- or cleaning-active shapes.

DESCRIPTION OF THE INVENTION

It has now been found that the conventional disintegrating agents known from the production of pharmaceutical tablets lead to rapidly disintegrating washing- or cleaning-active shapes providing they are not used in the usual way.

In a first embodiment, therefore, the present invention relates to a washing- or cleaning-active shape containing at least one disintegrating agent which is capable of increasing the porosity or capillarity of shapes, more particularly tablets, and which has a high adsorption capacity for water, this disintegrating agent being present in the shape in granular and optionally in co-granulated form, the granules of disintegrating agent (disintegrator granules) containing at least 20% by weight and preferably 25 to 100% by weight of the disintegrating agent or—where several disintegrating agents are used—the disintegrating agents and the particle size distribution (sieve analysis) being such that at most 1% by weight, preferably less, of dust-fine particles are present and a total—including any dust-fine particles present—of less than 10% by weight of the disintegrator granules being smaller than 0.2 mm in size. In one advantageous embodiment, at least 90% by weight of the disintegrator granules have a particle size of at least 0.2 mm and at most 3 mm.

In the context of the present invention, disintegrating agents in granular form or in co-granulated form or disintegrator granules are understood to include any disintegrating agents which are present per se in the form of fine-particle powders and which have been converted into coarser particles by spray drying, granulation, agglomeration, compacting, pelleting or extrusion.

A definition of what is meant by washing- or cleaning-active shapes was given earlier on. They are primarily cylindrical objects or tablets which may be used as laundry detergents, dishwashing detergents, bleaching agents (spotting salts) and optionally as pretreatment agents, for example as water softeners or bleaching agents. However, the term "shape" is not confined to tablets and, in principle, encompasses any three-dimensional form which the starting materials can be made to assume, optionally under the effect of an external container. Cylindrical shapes can have a height which is smaller or greater than or equal to the diameter of the base. However, the shapes may also have an angular base, for example a rectangular base, more particularly a square base, or even a rhombic or trapezoidal base. Other versions include three-cornered or more than four-cornered bases of the shape.

By virtue of the outstanding disintegrating properties of the shapes according to the invention, it is possible, but not absolutely essential, directly to introduce the shapes into the aqueous liquor of a machine washing process by means of a dispenser. It is even possible to place the shape or shapes in the dispensing compartment of commercially available domestic machines, more particularly washing machines. Accordingly, in one preferred embodiment of the invention, the three-dimensional form of the shapes is adapted in its dimensions to the dispensing compartment of commercially available domestic machines.

Another preferred shape has a plate-like or slab-like structure with alternately thick long segments and thin short segments, so that individual segments can be broken off from this "bar" at the predetermined weak spots, which the short thin segments represent, and introduced into the machine or rather into the dispensing compartment of the machine. This "bar" principle can also be embodied in other geometric forms, for example vertical triangles which are only joined to one another at one of their longitudinal sides.

In one preferred embodiment, the invention provides homogenous or heterogeneous shapes, more particularly tablets, the tablets having a diameter of preferably 20 to 60 mm and, more preferably, of 40±10 mm. The height of these tablets is preferably 10 to 30 mm and more preferably 15 to 25 mm. The weight of the individual shapes, more particularly the tablets, is preferably between 15 and 60 g and more preferably between 25 and 40 g per shape or tablet. By contrast, the density of the shapes or tablets normally assumes values above 1 kg/dm$^3$ and preferably between 1.1 and 1.4 kg/dm$^2$. Depending on the nature of the application, the water hardness range and the degree of soiling, one or more shapes, for example 2 to 4 shapes, more particularly tablets, may be used. Other shapes according to the invention may even have smaller diameters or dimensions, for example of the order of 10 mm.

A homogeneous shape in the context of the present invention is one in which the ingredients of the detergent are uniformly distributed throughout the shape. Accordingly, heterogeneous shapes are shapes in which the ingredients are not homogeneously distributed. Heterogeneous shapes may be produced, for example, by compressing the various ingredients to form a shape comprising several layers, i.e. at least two layers, rather than into a monolayer shape. These various layers may have different disintegration and dissolving rates. This can provide the shapes with favorable performance properties. If, for example, the shapes contain ingredients which adversely affect one another, one component may be integrated in the more quickly disintegrating and dissolving layer while the other component may be incorporated in a more slowly disintegrating layer so that the first component can act in advance or can already have reacted off by the time the second component dissolves. The various layers of the shapes can be arranged in the form of a stack, in which case the inner layer(s) dissolve at the edges of the shape before the outer layers have completely dissolved or disintegrated. Alternatively, however, the inner layer(s) may also be completely surrounded by the layers lying further to the outside which prevents constituents of the inner layer(s) from dissolving prematurely.

In another preferred embodiment of the invention, a tablet consists of at least three layers, i.e. two outer layers and at least one inner layer, a peroxy bleaching agent being present in at least one of the inner layers whereas, in the case of the stack-like tablet, the two cover layers and, in the case of the envelope-like tablet, the outermost layers are free from peroxy bleaching agent. In another possible embodiment, peroxy bleaching agent and any bleach activators or bleach catalysts present and/or enzymes may be spatially separated from one another in one and the same tablet/shape. Embodiments such as these have the advantage that, even in cases where the shape/tablet of detergent or bleaching agent is introduced into the washing machine or into the hand washing bowl in direct contact with the fabrics, there would be no danger of spotting by bleaching agent or the like on the fabrics.

Other examples of heterogeneous shapes can be found, for example, in European patent applications EP-A-0 711 827, EP-A-0 711 828 and EP-A-0 716 144.

According to the above definition, several disintegrating agents may be used either individually or in combination, being present in the same disintegrator granules or in various disintegrator granules. Where various disintegrator granules are to be used, preferably more than 40% by weight, more preferably at least 50% by weight and, most preferably, at least 60% by weight, based on the total quantity of disintegrator granules used, have a composition and particle size distribution of the type mentioned above. However, since it is precisely the coarser than usual type of disintegrating agent used which accelerates disintegration of the washing- or cleaning-shape, it is of particular advantage, and highly desirable, for all the various disintegrator agent granules used to have the features mentioned above.

Preferred disintegrating agents which have to be converted into granular form or into co-granulated form include starch and starch derivatives, cellulose and cellulose derivatives, for example microcrystalline cellulose, CMC, MC, alginic acid and salts thereof, carboxymethyl amylopectin, polyacrylic acid, polyvinyl pyrrolidone and polyvinyl polypyrrolidone. The disintegrator granules may be conventionally produced, for example by spray drying or superheated steam drying of aqueous preparations or by granulation, pelleting, extrusion or roll compacting. It can be of advantage to incorporate additives, granulation aids, carriers or coating agents of known types in the disintegrating agents (co-granulated form). In one preferred embodiment of the invention, additives are non-surface-active ingredients of detergents or cleaning compositions, more particularly bleach activators and/or bleach catalysts. Particularly preferred disintegrating agent granules are those which contain tetraacetyl ethylenediamine (TAED) and/or other conventional bleach activators as additives. Disintegrator granules such as these may advantageously be produced by co-granulation of the disintegrating agent with the additive, co-granulation in this way can increase the distribution of the disintegrating agent in the shape, more especially in the tablet, which in certain cases can also lead to an improvement in the disintegration rate of the shape/tablet.

According to the present invention, it is particularly preferred to use cellulose-containing disintegrating agents of the type described in earlier German patent application 197 09 991.2. These disintegrating agents are cellulose-containing materials which have been compacted, compacted wood-based materials, such as TMP (thermomechanical pulp) or CTMP (chemothermomechanical pulp) preferably being used. Particularly preferred disintegrating agents such as these are commercially available from the Rettenmaier Company, for example, under the names of Arbocel® B and Arbocel® BC (beech cellulose), Arbocel® BE (beech sulfite cellulose), Arbocel® B-SCH (cotton cellulose), Arbocel® FIC (spruce cellulose) and other Arbocel® types (Arbocel® TF-30-HG).

In one embodiment of the invention, the content of actual disintegrating agents in the disintegrator granules is preferably from 50 to 100% by weight and more preferably at least 70% by weight, embodiments containing at least 80 or even 90% by weight or more being particularly advantageous. Disintegrator granules which are made almost entirely of the commercially available disintegrating agents, i.e. contain between 97 and 100% by weight of the commercially available disintegrating agents, are also possible.

In another preferred embodiment of the invention in which the disintegrating agent is used in co-granulated form, more especially in combination with TAED, in the disintegrator granules, the content of disintegrating agent in the granules is more than 20% by weight and less than 70% by weight, advantageously at least 70% by weight and more particularly from 80 to 100% by weight of the other constituents, based on the other constituents in the disintegrator granules, consisting of active substances, such as bleach activator, more especially TAED, and/or bleach catalyst.

If fines smaller than 0.2 mm in size should accumulate in the production of the disintegrator granules, not only is it preferred to remove them to such an extent that the disintegrator granules are substantially free from dust (dust in the context of the invention being particles smaller than 0.1 mm in size, see above), but also to such an extent that the total content of particles smaller than 0.2 mm in size is minimized to 0–5% by weight. In another preferred embodiment, at least 90% by weight of the disintegrator granules have a particle size of at least 0.3 mm and at most 3 mm, more particularly up to at most 2 mm.

In one preferred embodiment, the shapes according to the invention contain disintegrator granules in quantities of 1 to 20% by weight and preferably in quantities of 2 to 15% by weight, quantities of up to 10% by weight being particularly preferred.

In another preferred embodiment of the invention, not only the disintegrator granules, but also the other constituents of the detergent shape are mainly present in the particulate form mentioned in the foregoing. Thus, preferably at least 50% by weight of the other constituents and more preferably at least 70% by weight have a particle size distribution of 0.2 to 3 mm. In this case, too, it is particularly important that the other constituents should only contain 0 to 5% by weight of particles smaller than 0.2 mm in size. In one particularly advantageous embodiment, at least 90% by weight of the other constituents have particle sizes of 0.2 to 3.0 mm. In the other constituents also, dust should be avoided as far as possible. This is achieved, for example, by the other constituents being present in granular form and/or being combined in one or more compounds which may be conventionally produced, for example by spray drying, superheated steam drying, granulation/agglomeration, fluidized bed granulation, roll compacting, pelleting or extrusion. Any fines smaller than 0.2 mm in size accumulating in the production of these compounds are preferably removed before mixing with the disintegrator granules. Surface treatment compositions, such as powdering agents, which are known to consist of very fine particles and which are just not used in coarse-particle form, are specifically not included in the overall particle size distribution of the other constituents. Both disintegrator granules and also other constituents may be aftertreated with solid fine-particle surface treatment compositions.

The other constituents may be any typical detergent ingredients, pretreatment compositions, bleaching agents and water softeners. These include above all anionic, nonionic, cationic, amphoteric and zwitterionic surfactants, inorganic and organic, water-soluble or water-insoluble builders and co-builders, bleaching agents, more especially peroxy bleaching agents, and active chlorine compounds which are advantageously coated, bleach activators and bleach catalysts, enzymes and enzyme stabilizers, foam inhibitors, redeposition inhibitors, substances which prevent the resoiling of fabrics, so-called soil repellents, and typical inorganic salts, such as sulfates and organic sulfates, such as phosphonates, optical brighteners and dyes and perfumes. In addition, the use of conventional silver protectors is recommended for machine dishwashing detergents.

Preferred anionic surfactants include both those based on petrochemicals, such as alkyl benzenesulfonates and alkane sulfonates and alkyl (ether)sulfates with odd chain lengths, and those based on native materials, for example fatty alkyl sulfates or fatty alkyl (ether)sulfates, soaps, sulfosuccinates, etc. Alkyl benzenesulfonates and/or various chain cuts of alkyl sulfates or alkyl ether sulfates are particularly preferred, optionally in combination with small quantities of soap. Whereas, in the case of alkyl benzenesulfonates, $C_{11-13}$ alkyl benzenesulfonate and $C_{12}$ alkyl benzenesulfonate are preferred, preferred chain cuts in the case of the alkyl (ether)sulfates are $C_{12}$ to $C_{16}$, $C_{12}$ to $C_{14}$, $C_{14}$ to $C_{16}$, $C_{16}$ to $C_{18}$ or $C_{11}$ to $C_{15}$ or $C_{13}$ to $C_{15}$.

Preferred nonionic surfactants include in particular $C_{12-18}$ fatty alcohols ethoxylated with on average 1 to 7 moles of EO per mole of alcohol and the corresponding $C_{11-17}$ alcohols, more particularly $C_{13-15}$ alcohols, and the more highly ethoxylated alcohols with the chain lengths mentioned known from the field of detergents and cleaning compositions, amine oxides, alkyl polyglycosides, polyhydroxyfatty acid amides, fatty acid methyl ester ethoxylates and gemini surfactants.

Preferred inorganic builders are, in particular, conventional phosphates, preferably tripolyphosphate, zeolites, more especially zeolite A, zeolite P, zeolite X and mixtures thereof, and carbonates, hydrogen carbonates and crystalline and amorphous silicates with multiple wash cycle performance. Conventional co-builders include, above all, (co) polymeric salts of (poly)carboxylic acids, for example copolymers of acrylic acid and maleic acid, and also polycarboxylic acids and salts thereof, such as citric acid, tartaric acid, glutaric acid, succinic acid, polyaspartic acid, etc. The expert knows the organic co-builders suitable for use in accordance with the invention from innumerable publications on the subject of detergents and cleaners.

Suitable bleaching agents are, above all, the peroxy bleaching agents widely used at the present time, such as perborate and percarbonate, above all in combination with conventional bleach activators and bleach catalysts, more especially in the field of dishwashing detergents, and the active chlorine compounds mentioned earlier on.

Among the enzymes, not only proteases, but also lipases, amylases, cellulases and peroxidases and combinations of these enzymes are of particular interest.

A preferred embodiment of the invention is characterized by the use of anionic surfactant-containing compounds in various anionic surfactants—for example alkyl sulfates and alkenyl benzenesulfonates and/or soap or even alkyl sulfates and sulfonated fatty acid glycerol esters—and/or anionic surfactants are present in combination with nonionic surfactants, for example alkyl sulfates of various chain lengths, optionally even several types of alkyl sulfates with various chain lengths in combination with ethoxylated alcohols and/or other nonionic surfactants of the type mentioned above. For example, anionic and nonionic surfactants may also be predominantly accommodated in two different compounds.

In another preferred embodiment of the invention, at least 50% by weight and preferably 60 to 100% by weight of the other constituents are aftertreated before mixing with the disintegrator granules, i.e. are sprayed or powdered under granulating conditions, the water-free aftertreatment being particularly preferred. Preferred liquid constituents include nonionic surfactants and/or polyethylene glycols. However, in another particularly preferred embodiment, the other constituents may also be aftertreated with a water-free melt of nonionic compounds solid at room temperature, more particularly with polyethylene glycols having relative molecular weights above 2,000 and above all between 4,000 and 12,000. As in the case of the disintegrator granules, suitable powdering agents are, above all, fine-particle zeolites, silicas, sulfates, calcium stearates, phosphates and/or acetates. In another preferred embodiment of the invention, dust and particles smaller than 0.2 mm in size are completely removed before mixing with the disintegrator granules. Applicants assume that this known measure of surface treatment delays dissolution of the particles in the shape/tablet before its actual disintegration and, for this reason, contributes towards the particularly outstanding disintegration properties of the shapes/tablets in the aqueous liquor in the production of shapes in combination with the disintegrator agent granules having a specific particle size distribution.

The invention can also make use of the fact that acidifying agents, such as citric acid, tartaric acid or succinic acid, and also acidic salts of inorganic acids ("hydrogen salts"), for example bisulfates, above all in combination with carbonate-containing systems, can also contribute towards improving the disintegration properties of the shapes. According to the invention, however, these acidifying agents are also used in the form of coarse particles, more particularly granules, which are substantially free from dust and which are adapted in their particle size distribution to the disintegrator granules. The granular acidifying agents may be present in the shapes, for example, in quantities of 1 to 10% by weight.

As already repeatedly mentioned, the shapes according to the invention, more especially the hitherto poorly disintegrating and poorly soluble detergent tablets and bleach tablets, have outstanding disintegration properties. This can be tested, for example, under critical conditions in a normal domestic washing machine bleach/detergent tablet used directly in the wash liquor with the aid of a conventional dispenser, delicates program or coloreds program, washing temperature max. 40° C.) or in a glass beaker at a water temperature of 25° C. The carrying out of the corresponding tests is described in the Examples. Under these conditions, the shapes according to the invention not only disintegrate completely in 10 minutes, the preferred embodiments have disintegration times in the glass beaker test of less than 3 minutes and, more particularly, less than 2 minutes. Particularly advantageous embodiments even have disintegration times of less than 1 minute. Disintegration times of less than 3 minutes in the glass beaker test are sufficient to ensure than the detergent shapes or detergent additive shapes are flushed into the wash liquor from the dispensing compartment of conventional domestic washing machines. In another embodiment, therefore, the present invention relates to washing process in which the detergent shapes are introduced into the wash liquor from the dispensing compartment of a domestic washing machine. The dissolving time of the detergent shapes in the washing machine is preferably less than 8 minutes and more preferably less than 5 minutes.

The actual production of the shapes according to the invention is carried out by initially dry mixing the disintegrator granules with the other constituents and then shaping the resulting mixture, more particularly by compression, into tablets using conventional processes (for example as described in the conventional patent literature on tabletting, above all in the field of detergents of cleaners, more particularly as described in the above-cited patent applications and in the article entitled "Tablettierung: Stand der Technik" in SÖFW Journal, Vol. 122, pages 1016–1021 (1996).

EXAMPLES

A granular detergent product with a particle size distribution where more than 90% by weight of the particles were between 0.2 and 2 mm in size with no dust, consisting of 12.9 parts by weight of alkyl benzenesulfonate, 7.4 parts by weight of $C_{13-15}$ alcohol containing on average 5 EO, 0.8 part by weight of soap, 10.5 parts by weight of sodium carbonate, 21 parts by weight of zeolite A, 1.8 parts by weight of sodium silicate (1:3.0), 3 parts by weight of a copolymer typically used in detergents as a co-builder, 0.5 part by weight of phosphonate, 16 parts by weight of perborate monohydrate, 2.5 parts by weight of enzyme granules, 7 parts by weight of granular bleach activator (tetraacetyl ethylenediamine), 3 parts by weight of foam inhibitor granules based on silicone oil and 8 parts by weight of water, were mixed in accordance with the invention with 4 parts by weight of disintegrator granules (Arbocel® TF-30-HG, a product of Rettenmeier), which was also dust-free with more than 90% by weight of the particles between 0.2 and 2 mm in size, and the resulting mixture was subsequently compressed to form a tablet T1. The tablet press used was a Korsch EK4 press. The tablet obtained had a diameter of 44 mm, a height of 20 mm and a weight of 40 g per tablet.

For comparison, a tablet C1 of the same size and the same weight was produced with 4 parts by weight of microcrystalline cellulose (Avicel® PH-102, a product of FMC, mean particle size 100 μm) instead of the disintegrator granules mentioned.

The hardness of the tablets was measured by deformation to breakage, the force acting on the sides of the tablet and the maximum force which the tablet withstood being determined.

To determine its disintegration rate, the tablet was placed in a glass beaker filled with water (600 ml Düsseldorf municipal water, hardness 16° dH, temperature 30° C.) and the time which the tablet took to disintegrate completely in the absence of mechanical action was measured.

The experimental data are set out in Table 1:

TABLE 1

Detergent tablets [physical data]

| Tablet | T1 | C1 |
|---|---|---|
| Tablet hardness | 45 N | 44 N |
| Tablet disintegration | <30 secs. | >60 secs. |

What is claimed is:

1. A process for making a solid, shaped composition, said process comprising the steps of forming a disintegrating agent by compacting cellulose or a cellulose derivative, forming disintegrating agent particles comprising the disintegrating agent, dry mixing a washing- or cleaning-active substance and an amount of the disintegrating agent particles effective to rapidly dissolve or disperse the composition in water, said disintegrating agent particles having a particle size distribution of less than 10% by weight smaller than about 0.2 mm particle size and no more than 1% by weight of dust-free particles, and shaping the resulting mixture into a tablet.

2. A process according to claim 1, wherein the tablet is shaped by compression.

3. A process according to claim 1, wherein the disintegrating agent particles are formed by spray drying, granulation, agglomeration, compacting, pelleting, or extrusion.

4. A process according to claim 1, wherein at least about [951] *95%* by weight of said disintegrating agent particles have a particle size of at least 0.2 mm and at most 3 mm.

5. A process according to claim 1, wherein at least about 90% by weight of said disintegrating agent particles have a particle size of at least 0.2 mm and at most 3 mm.

6. A process according to claim 1, wherein at least about 90% by weight of said disintegrating agent particles have a particle size of at least 0.2 mm and at most 1.6 mm.

7. A process according to claim 1, wherein at least about 90% by weight of said disintegrating agent particles have a particle size of at least 0.3 mm and at most 3 mm.

8. A process according to claim 1, wherein at least about 90% by weight of said disintegrating agent particles have a particle size of at least 0.3 mm and at most 2 mm.

9. A process according to claim 1, wherein said tablet comprises about 1% to about 20% by weight of said disintegrating agent particles.

10. A process according to claim 9, wherein said tablet comprises about 2% to about 15% by weight of said disintegrating agent particles.

11. A process according to claim 10, wherein said tablet comprises about 2% to about 10% by weight of said disintegrating agent particles.

12. A process according to claim 1, wherein said disintegrating agent particles comprise at least about 20% by weight of said disintegrating agent.

13. A process according to claim 12, wherein said disintegrating agent particles comprise at least about 50% by weight of said disintegrating agent.

14. A process according to claim 13, wherein said disintegrating agent particles comprise at least about 70% by weight of said disintegrating agent.

15. A process according to claim 14, wherein said disintegrating agent particles comprise at least about 80% by weight of said disintegrating agent.

16. A process according to claim 15, wherein said disintegrating agent particles comprise at least about 90% by weight of said disintegrating agent.

17. A process according to claim 16, wherein said disintegrating agent particles comprise at least about 97% by weight of said disintegrating agent.

18. A process according to claim 1, wherein said cellulose or cellulose derivative is selected from the group consisting of thermomechanical pulp and chemothermomechanical pulp.

19. A process according to claim 1, wherein said cellulose or cellulose derivative is selected from the group consisting of beech cellulose, beech sulfite cellulose, cotton cellulose, spruce cellulose and combinations thereof.

20. A process for making a solid, shaped composition, said process comprising the steps of forming disintegrating agent particles by compacting cellulose or a cellulose derivative, dry mixing a washing- or cleaning-active substance and an amount of the disintegrating agent particles effective to rapidly dissolve or disperse the composition in water, said disintegrating agent particles having a particle size distribution of less than 10% by weight smaller than about 0.2 mm particle size and no more than 1% by weight of dust-fine particles, and shaping the resulting mixture into a tablet.

21. A process according to claim 20, wherein the tablet is shaped by compression.

22. A process according to claim 20, wherein at least about 95% by weight of said disintegrating agent particles have a particle size of at least 0.2 mm and at most 3 mm.

23. A process according to claim 20, wherein at least about 90% by weight of said disintegrating agent particles have a particle size of at least 0.2 mm and at most 3 mm.

24. A process according to claim 20, wherein at least about 90% by weight of said disintegrating agent particles have a particle size of at least 0.2 mm and at most 1.6 mm.

25. A process according to claim 20, wherein at least about 90% by weight of said disintegrating agent particles have a particle size of at least 0.3 mm and at most 3 mm.

26. A process according to claim 20, wherein at least about 90% by weight of said disintegrating agent particles have a particle size of at least 0.3 mm and at most 2 mm.

27. A process according to claim 20, wherein said tablet comprises about 1% to about 20% by weight of said disintegrating agent particles.

28. A process according to claim 27, wherein said tablet comprises about 2% to about 15% by weight of said disintegrating agent particles.

29. A process according to claim 28, wherein said tablet comprises about 2% to about 10% by weight of said disintegrating agent particles.

30. A process according to claim 20, wherein said cellulose or cellulose derivative is selected from the group consisting of thermomechanical pulp and chemothermomechanical pulp.

31. A process according to claim 20, wherein said cellulose or cellulose derivative is selected from the group consisting of beach cellulose, beach sulfite cellulose, cotton cellulose, spruce cellulose and combinations thereof.

*32. A process according to claim 26, wherein said tablet comprises about 2% to about 10% by weight of said disintegrating agent particles.*

* * * * *

UNITED STATES PATENT AND TRADEMARK OFFICE

CERTIFICATE OF CORRECTION

PATENT NO. : RE 39,139 E
APPLICATION NO. : 10/414962
DATED : June 20, 2006
INVENTOR(S) : Gerhard Blasey et al.

It is certified that error appears in the above-identified patent and that said Letters Patent is hereby corrected as shown below:

On the Title Page:

Item (56): References Cited: Other Publications, document listed as "Novak, J., Enzyme Tablets, Chem. Abs. & Indexes vol. 22, No. 2 (Jan. 1995) XP000666852, Rompp Chemie Lexikon 9.sup.th Ed., vol. 6, pp.3207-3212, 4295, 4439-4440 and 4990-4993." should read --Novak, J., Enzyme Tablets, Chem. Abs. & Indexes vol. 122, No. 2 (Jan. 1995) XP000666852, Rompp Chemie Lexikon 9.sup.th Ed., vol. 6, pp.3207-3212, 4295, 4439-4440 and 4990-4993. --

In the Claims:

In Claim 31, at column 12, line 37, "consisting of beach cellulose, beach sulfite cellulose, cotton" should read -- consisting of beech cellulose, beech sulfite cellulose, cotton --

Signed and Sealed this

Seventeenth Day of October, 2006

JON W. DUDAS
*Director of the United States Patent and Trademark Office*